Aug. 13, 1935.  P. MODIGLIANI  2,011,252
GLASS ARTICLE
Filed Sept. 27, 1933  2 Sheets-Sheet 1
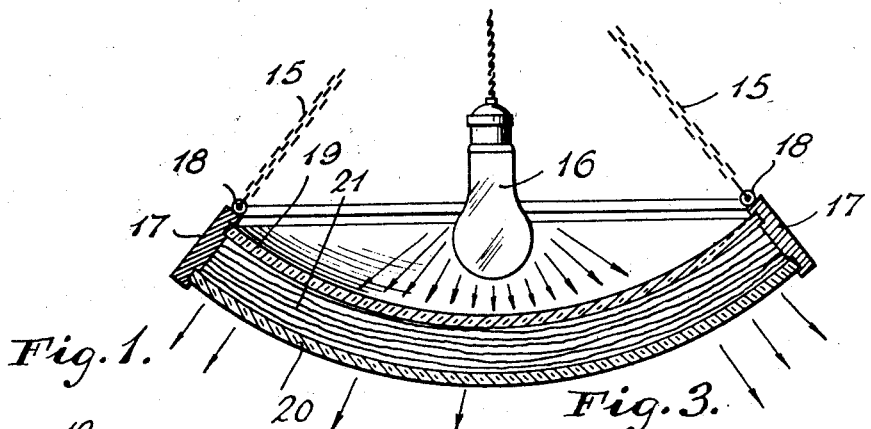
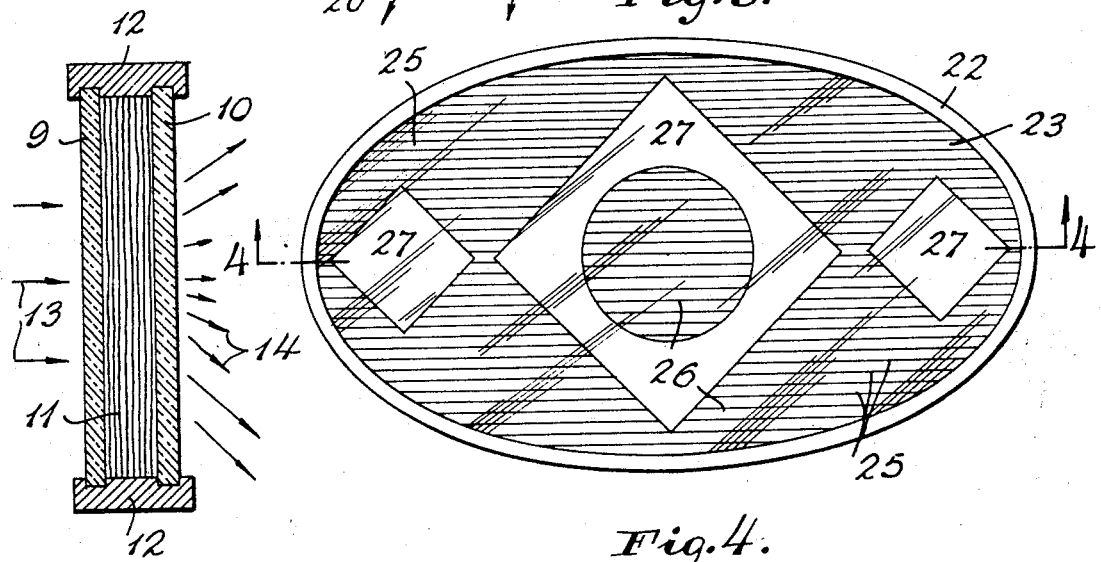
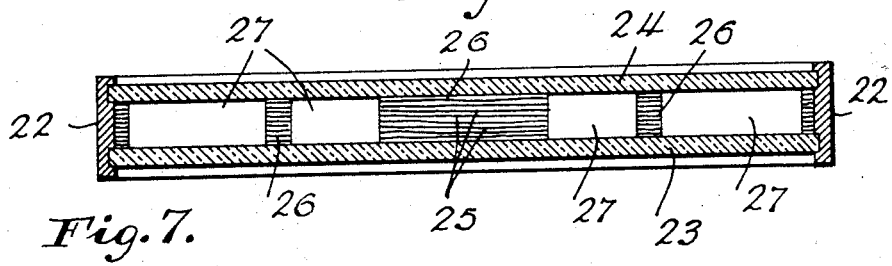
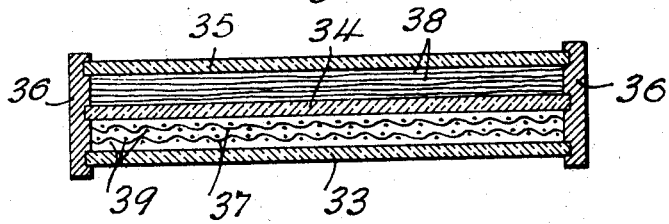
INVENTOR
PIERO MODIGLIANI
BY
ATTORNEYS Aug. 13, 1935.  P. MODIGLIANI  2,011,252
GLASS ARTICLE
Filed Sept. 27, 1933  2 Sheets-Sheet 2
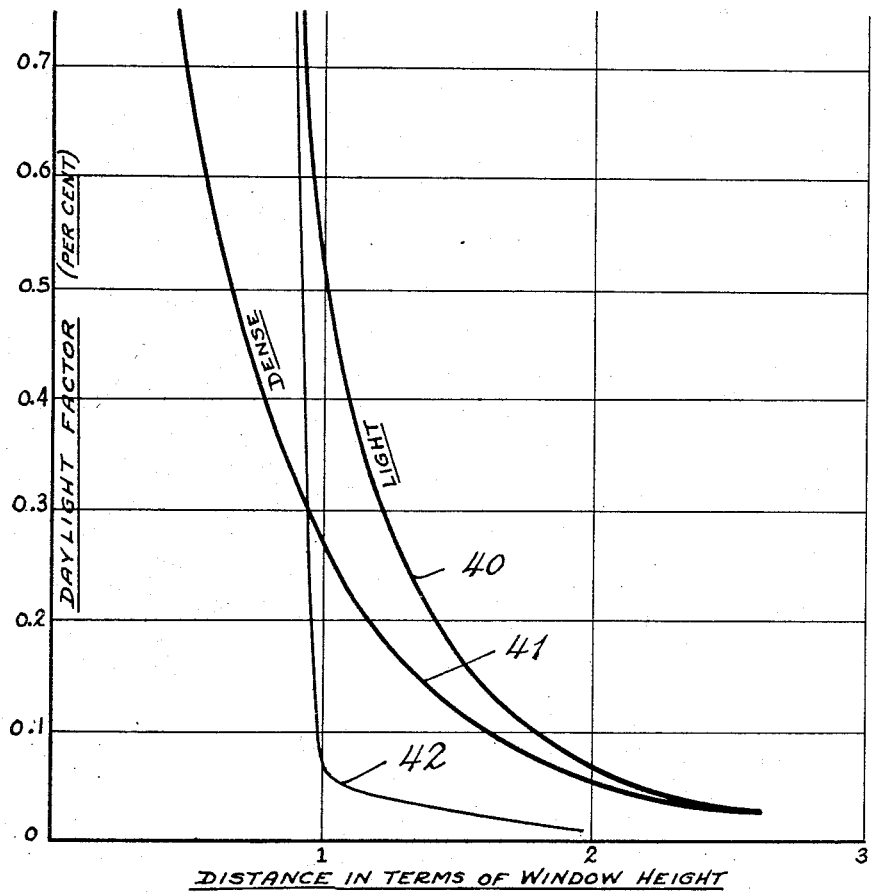
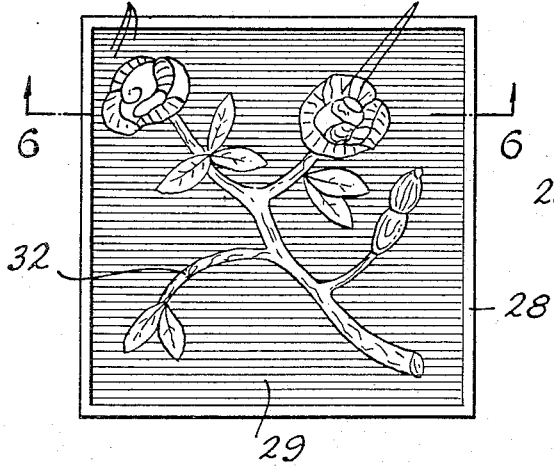
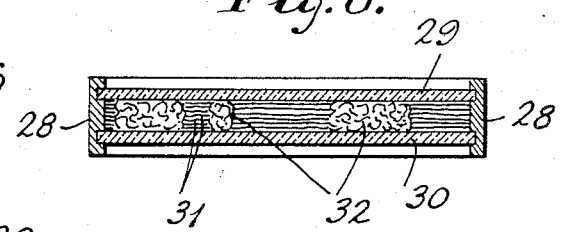
INVENTOR
PIERO MODIGLIANI
BY
Richards & Geier
ATTORNEYS Patented Aug. 13, 1935

2,011,252

UNITED STATES PATENT OFFICE 2,011,252

GLASS ARTICLE

Piero Modigliani, Livorno, Italy, assignor to Société Anonyme Vetreria Italiana Balzaretti Modigliani, Livorno, Italy, a corporation of Italy Application September 27, 1933, Serial No. 691,260
In Italy September 30, 1932

8 Claims. (Cl. 41—21)

This invention relates to articles containing glass and has particular reference to the use of glass wool or glass threads for glass partitions, window panes, light fixtures, glass ornaments, etc.

Glass wool or glass threads were used heretofore for the decoration of plate glass or glassware. It was customary to heat a surface of plate glass or glassware to soften the same and then to press glass threads arranged in the form of a design into the heated surface.

I have found that an article comprising glass wool or glass threads combined with transparent or translucent glass surfaces is an excellent sound-insulator and light-diffusor, in addition to being ornamental and decorative in appearance. It was also noticed that the light-diffusing and sound-insulating properties of an article of this type are increased to a considerable extent if the glass threads are merely held by friction or pressure between two surfaces.

An object of the present invention is, therefore, the provision of transparent or translucent portions of partition walls, window panes, electric light and gas fixtures, glass ornaments, etc. having excellent sound-insulating and light-diffusing properties.

A preferred embodiment of this invention consists in the use of a number of flat or curved glass surfaces or glass plates and glass threads or glass wool situated between each pair of adjacent glass surfaces, the glass surfaces being maintained at a certain distance from each other by a frame or a support.

Experiments have shown that such articles have excellent sound-insulating and light-diffusing properties. Their ornamental appearance may be enhanced through the use of colored plate glass or colored glass threads, or by arranging the glass threads in the form of a certain design.

The above and other objects of this invention will appear more clearly from the following detailed description when taken in connection with the accompanying drawings showing preferred embodiments of the inventive idea.

In the drawings:

Figure 1 is a cross-section through a window pane or partition element embodying the principles of this invention.

Fixture 2 is a vertical section through an electric light fixture.

Fixture 3 is a front view of a decorative article provided with a design.

Figure 4 is a section along the line 4—4 of Figure 3.

Figure 5 shows another decorative article in front view.

Figure 6 is a section along the line 6—6 of Figure 5.

Figure 7 is a vertical section through another glass article.

Figure 8 is a diagram illustrating the light-diffusing properties of three-ply glass manufactured in accordance with the principles of this invention.

The window pane or the light-transmitting element of a partition wall illustrated in Figure 1 of the drawings comprises a plate 9 of clear transparent glass situated at a certain distance from a similar glass plate 10. Glass threads 11 are placed in the form of superposed layers between the plate 9 and the plate 10 and extend preferably in the horizontal direction, although they may be placed vertically or at any convenient angle. The glass plates 9 and 10 are carried by a frame 12 which supports them at a certain distance from each other. The frame 12 and the glass plates 9 and 10 close hermetically the space within which the glass threads 11 are placed, thus increasing the sound-insulating properties of the device.

Light rays, which are shown by arrows 13 in Figure 1, penetrate into the space between the plates 9 and 10 and strike the glass threads 11 so that the light emerges in the form of diffused light rays 14. The diffusion of light which is caused by the presence of the glass threads 11, is particularly effective, because there is very little absorption or reflection of light. The same arrangement results in an excellent absorption of sound and heat waves.

It is possible to regulate to a certain extent the diffusion and dispersion of light rays 14 by arranging the glass threads 11 at any desired angle with respect to the frame 12 and/or to the incoming light rays 13.

The fixture or the chandelier illustrated in Figure 2 of the drawings is supported by members 15, the ends of which are attached to the ceiling of a room. An electric lamp 16 is used as a source of light. The fixture comprises a frame 17, which is attached at 18 to the supports 15. The frame 17 carries two curved glass plates 19 and 20 situated parallel to and at a certain distance from each other. Glass threads 21 are placed between the glass plates 19 and 20, and are also held by the frame 17. These glass threads have substantially the same curvature as that of the plates 19 and 20, although they may deviate from that curvature to a certain extent.

The article illustrated in Figures 3 and 4 of the drawings may be used as a plate glass window or as an ornamental decoration. It is formed by a frame 22, a glass plate 23 and another glass plate 24 situated parallel to and at a certain distance from the glass plate 23. The ornamental effect of the article illustrated in Figures 3 and 4 is caused by the particular arrangement of the glass threads 25, which are held in their proper places by the pressure of the glass plates 23 and 24. Due to this arrangement, the space between the glass plates 23 and 24 is divided into portions 26, which are filled with glass threads 25 and portions 27, which are hollow, or which may be filled with another material. The glass article illustrated in Figures 3 and 4 will have a highly decorative and ornamental appearance which may be increased by providing colored threads 25 and/or by providing colored glass plates 23 and 24.

The pane, partition or ornamental article illustrated in Figures 5 and 6 of the drawings is similar to that shown in Figures 3 and 4, and comprises a frame 28 holding glass plates 29 and 30. The space between the glass plates 29 and 30 is filled with glass threads 31, which are arranged parallel to each other, as well as with glass wool or glass threads 32 which are placed in different directions, so as to have the form of an ornamental design. Light rays passing through the glass threads 31 and 32 will be diffused in different ways, thus giving to the article a striking and effective appearance which may be further increased through the use of colored glass.

The window pane or partition element shown in Figure 7 comprises three glass plates 33, 34 and 35, supported at a certain distance from each other by a frame 36; glass threads 37 and 38 are placed between the plates 33 and 34, and the plates 34 and 35, respectively. Glass threads 39 extend in a direction perpendicular to that of the threads 37 and appear to be interwoven with the threads 37, forming a glass fabric.

The diagram illustrated in Figure 8 of the drawings was produced after actual experiments with three-ply glass of the type illustrated in Figure 1 of the drawings and known commercially under the trade name "Thermolux". The thickness of each three-ply glass was about $\frac{5}{32}$ of an inch and it had the shape of a square with each side 7½ inches long. For the purpose of experimentation light three-ply glass and dense three-ply glass were used and compared with a sheet of flashed opal glass. In Figure 8 the curve 40 is that of light three-ply glass, the curve 41 is that of dense three-ply glass while the curve 42 is that of clear glass. The curves illustrated the illumination in terms of daylight factor in percent as a function of the horizontal distances from a window in terms of window height.

Other measurements to determine the transmission of light incident normally on the glass have shown that the three-ply glass of minimum density manufactured in accordance with the principles of the present invention, has a transmission factor of 76%, while a sheet of flashed opal glass used for the purposes of comparison has a transmission factor of 47%.

Measurements of sound reduction were carried out with three-ply glass manufactured in accordance with the present invention and consisting of two sheets of clear glass each of which was 5/64 of an inch thick and measured 5 feet by 4 feet 19/64 inch. The layer of glass threads or glass wool was 9/64 of an inch thick. Glass articles of this type reduce the sound to a considerable extent. The sound reduction for 1600 cycles per second was found to be as high as 42 decibels. The sound reduction for 200 cycles per second is 23 decibels.

Obviously, the above dimensions are mere illustrations, since glass articles manufactured in accordance with the principles of this invention may have totally different dimensions.

The glass plates holding the glass threads may be transparent or translucent, colored or clear, flat, curved or of any suitable form. The glass may be smooth or provided with reliefs, polished, rough, or tempered. The glass plates may be provided with openings and/or with supporting members, which may be encased in the glass or glued thereto by an organic matter.

The glass threads or glass wool may be solid or hollow, clear or colored. They may be arranged either parallel to each other or placed in a number of superposed layers, the threads of one layer having a direction different from that of the other layers, or they may be woven to form glass fabrics.

Throughout this specification and claims, the term "glass threads" is to be understood as comprising glass wool and similar material.

Glass articles manufactured in accordance with the principles of this invention are excellent heat insulators, since they absorb the heat waves to a very large extent.

What is claimed is:

1. An article of manufacture, comprising a glass surface and an elastic layer of loose glass threads held solely by friction upon said surface, whereby the heat- and sound-insulating and light-diffusing properties of the article are increased.

2. An article of manufacture, comprising at least two glass surfaces and an elastic layer of loose glass threads interposed and held solely by friction between said glass surfaces, whereby the heat- and sound-insulating and light-diffusing properties of the article are increased.

3. An article of manufacture, comprising at least two glass surfaces, a layer of loose glass threads interposed and held solely by friction between said glass surfaces, whereby the heat- and sound-insulating and light-diffusing properties of the article are increased, and a frame connected with said glass surfaces and maintaining the glass surfaces and the layer of glass threads elastically united.

4. An article of manufacture, comprising a plurality of glass surfaces, a plurality of elastic layers of loose glass threads interposed between at least some of the adjacent glass surfaces and held solely by friction therebetween, whereby the heat- and sound-insulating and light-diffusing properties of the article are increased, and means connected with said glass surfaces and maintaining at least some of said glass surfaces at predetermined distances from each other.

5. An article of manufacture, comprising a plurality of glass surfaces, a plurality of elastic layers of loose glass threads interposed between at least some of the adjacent glass surfaces and held solely by friction therebetween, whereby the heat- and sound-insulating and light-diffusing properties of the article are increased, and means connected with said glass surfaces and with at least some of said layers of loose glass threads, and maintaining at least some of said glass surfaces at predetermined distances from each other.

6. An article of manufacture, comprising two glass surfaces, means connected with said surfaces for maintaining the same at a predetermined distance from each other, and a layer of loose glass threads elastically interposed and held solely by friction between said glass surfaces, whereby the heat- and sound-insulating and light-diffusing properties of the article are increased, said layer of loose glass threads being situated in a part of the space between said surfaces to produce an ornamental effect.

7. An article of manufacture, comprising two glass surfaces, means connected with said surfaces for hermetically closing the space between said surfaces, and an elastic layer of loose glass threads situated in said space and held solely by friction between said glass surfaces, whereby the heat- and sound-insulating and light-diffusing properties of the article are increased.

8. An article of manufacture, comprising two glass surfaces, an elastic layer of loose glass threads interposed between said glass surfaces, and means for pressing at least one of said glass surfaces against said elastic layer of loose glass threads, whereby said layer is held solely by friction between said glass surfaces and the heat- and sound-insulating and light-diffusing properties of the article are increased.

PIERO MODIGLIANI.